United States Patent
De Vittorio et al.

[15] 3,658,676
[45] Apr. 25, 1972

[54] MONITORING APPARATUS AND PROCESS FOR CONTROLLING COMPOSITION OF AQUEOUS ELECTRODEPOSITION PAINT BATHS

[72] Inventors: Joseph M. De Vittorio, Homewood, Ill.; Raymond E. Story, Valparaiso, Ind.

[73] Assignee: The Sherwin-Williams Company, Cleveland, Ohio

[22] Filed: May 13, 1970

[21] Appl. No.: 37,423

Related U.S. Application Data

[63] Continuation of Ser. No. 566,056, July 18, 1966, abandoned.

[52] U.S. Cl. .................................. 204/181, 204/299, 118/7
[51] Int. Cl. ....................................... B01k 5/02, C23b 13/00
[58] Field of Search ................. 118/10, 7; 134/113; 204/299, 204/181, 195, 300

[56] References Cited

UNITED STATES PATENTS

| 2,552,749 | 5/1951 | Tabet | 184/1.5 |
|---|---|---|---|
| 2,626,620 | 1/1953 | Smith | 134/57 |
| 3,475,316 | 10/1969 | DeVittorio | 204/299 |
| 1,951,035 | 3/1934 | Parker | 324/30 B |
| 2,260,840 | 10/1941 | Rowe | 324/30 B |
| 2,383,450 | 8/1945 | Coleman | 204/195 |
| 2,576,362 | 11/1951 | Rimbach | 204/181 |
| 2,632,144 | 3/1953 | Borell et al. | 137/93 |
| 2,748,790 | 6/1956 | Hodgens | 137/5 |
| 2,819,726 | 1/1958 | Rendel | 137/392 |
| 2,985,826 | 5/1961 | Fluegel | 324/61 |
| 3,082,372 | 3/1963 | Gauthier | 324/30 |
| 3,151,052 | 9/1964 | Arthur et al. | 204/195 |
| 3,214,301 | 10/1965 | Polock et al. | 118/4 |
| 3,273,580 | 9/1966 | Ladd | 137/93 |
| 3,312,189 | 4/1967 | McVey | 118/11 |
| 3,327,204 | 6/1967 | Hillier et al. | 204/195 |
| 3,355,373 | 11/1967 | Brewer et al. | 204/181 |
| 3,404,079 | 10/1968 | Boardman | 204/181 |

Primary Examiner—John H. Mack
Assistant Examiner—A. C. Prescott
Attorney—Johnston, Root, O'Keeffe, Keil, Thompson & Shurtleff

[57] ABSTRACT

A monitoring device is provided for indicating the characteristics of a paint bath adapted for the electrodeposition of paint and containing finely divided solid material and non-volatile binder carried in a suitable liquid vehicle, said device comprising a conduit adapted to be connected to a receptacle containing a main body of said paint which conduit is of sufficient length that the electrical charge on the main body of paint is negligible on liquid samples of the main body of paint carried in said conduit at the point where said conduit enters said monitoring device, a plurality of test probes in said conduit within said monitoring device at spaced intervals, means for applying electrical energy to activate said probes, means for measuring the characteristics of liquid material carried by said conduit in terms of the electrical response of the probes to said applied electrical activating energy, and means for indicating such measurements to the operator of said device.

6 Claims, 18 Drawing Figures

Patented April 25, 1972

INVENTORS:-
JOSEPH M. DEVITTORIO
RAYMOND E. STORY

BY: Marzall, Johnston, Cook & Root
ATT'YS

Patented April 25, 1972
3,658,676
8 Sheets-Sheet 3
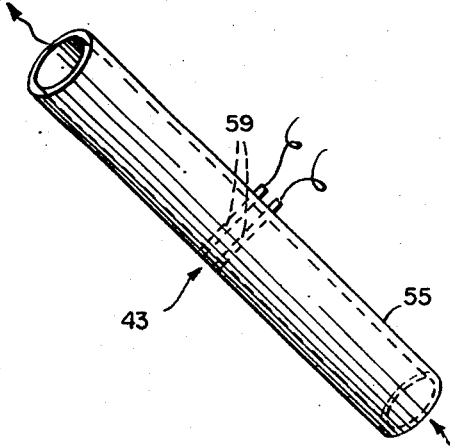
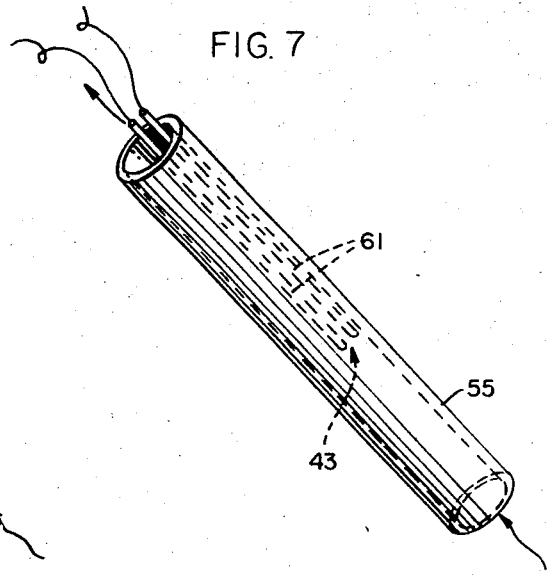
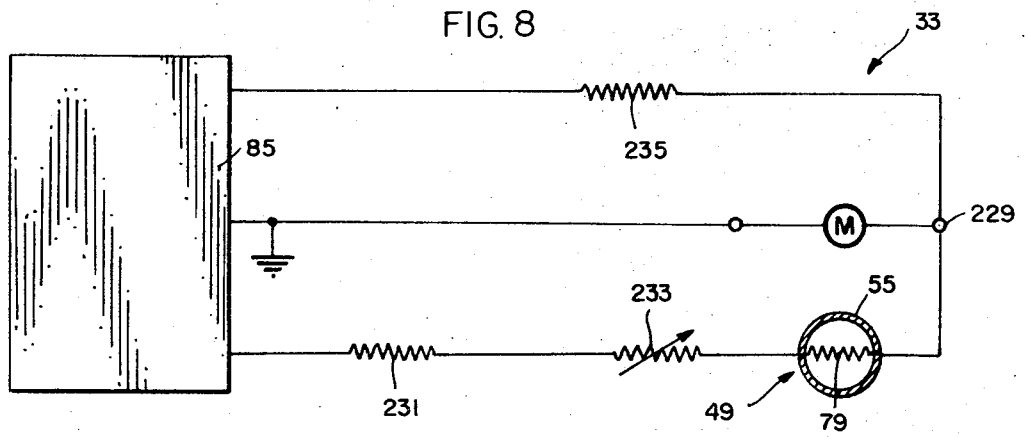
INVENTORS:-
JOSEPH M. DEVITTORIO
RAYMOND E. STORY
BY: Marzall, Johnston, Cook & Root
ATT'YS

Patented April 25, 1972 3,658,676

INVENTORS:-
JOSEPH M. DeVITTORIO
RAYMOND E. STORY

BY: *Marzall, Johnston, Cook & Root*
ATT'YS

Patented April 25, 1972 3,658,676

*INVENTORS:-*
JOSEPH M. DeVITTORIO
RAYMOND E. STORY

BY:- Marzall, Johnston, Cook & Root
ATT'YS

Patented April 25, 1972

*INVENTORS:*
JOSEPH M. DE VITTORIO
RAYMOND D. STORY

BY *Marzall, Johnston, Cook & Root*

ATT'YS

INVENTORS:-
JOSEPH M. DeVITTORIO
RAYMOND E. STORY
BY:- Marzall, Johnston, Cook & Root
ATT'YS Patented April 25, 1972

*INVENTORS:-*
JOSEPH M. DeVITTORIO
RAYMOND E. STORY

BY:- *Marzall, Johnston, Cook & Root*

ATT'YS

MONITORING APPARATUS AND PROCESS FOR MONITORING CONTROLLING COMPOSITION OF AQUEOUS ELECTRODEPOSITION PAINT BATHS

This application is a continuation of U.S. application, Ser. No. 566,056 filed July 18, 1966, now abandoned.

The present invention relates in general to the maintenance of uniformity in fluid mixtures, and has more particular reference to apparatus for and method of continuously monitoring a fluid mixture in order to determine its several variable characteristics, including relative proportions of non-volatile matter (NVM) and liquid forming the mixture, as well as the electrical resistivity, temperature, pH and like values of the fluid mixture being monitored. More specifically, the invention pertains to the method of and apparatus for continuously measuring or monitoring fluid mixtures of the sort comprising finely divided solid material, such as pigment, and a non-volatile binder, such as a resinous binder, carried in a suitable liquid vehicle, to form a coating bath in which articles may be immersed and coated with paint by electrodeposition, the invention further contemplating the application of derived data for the control of apparatus for adding various components to the bath, from time to time, in order to maintain a uniform ratio of bath component quantities, and to hold constant the resistivity and pH values of the fluid mixture.

Recent developments in the art of applying pigmentatious and other material upon objects to be coated, including, more particularly, the bodies of automotive vehicles, have provided for the application of coating material by electrodeposition from a bath comprising a fluid mixture of a suitable liquid carrier, such as water, and non-volatile matter (NVM), such as finely divided solid pigment material and a resinous paint binder, from which the solid material and binder are applied upon the article to be coated, the term "non-volatile matter" (NVM), as here employed, meaning solid or fluid material which does not volatilize when heated at temperatures of the order of 400° F. during an interval of the order of 30 minutes.

As a result of electrodeposition, the non-volatile bath constituents will progressively become depleted unless provision is made for replenishing the bath with material to replace that applied upon objects being coated. In the interests of uniformity of application of material to be coated by electrodeposition, it is desirable to maintain, in the coating bath, a uniform concentration of material to be coated, as precisely within previously determined limits.

An important object of the present invention is to provide for continuously measuring the concentration of coating materials in a coating bath and for adding bath components from time to time in order to maintain the same at desired uniform concentration.

It is likewise desirable, in the interests of deposition uniformity to maintain the temperature as well as the electrical resistivity of the fluid bath material at uniform levels; and, since the pH value of the fluid bath material affects the electrodeposition process, it is also desirable to maintain the fluid comprising the bath at a constant pH level. Resistivity, pH value, temperature and the proportion of non-volatile constituents of the bath are all interdependent factors in a bath having optimum coating characteristics; and it is, therefore, another important object of the present invention to provide apparatus for continuously scanning or monitoring fluid bath material to determine its above mentioned characteristics and to utilize the so obtained data for controlling the addition, in the bath, of bath components or ingredients, such as finely divided solid material, resinous binder material and liquid carrying material, from time to time, whenever and in the appropriate quantities needed to maintain desired bath characteristics.

Another important object is to provide for employing high frequency electronic equipment in detecting changes in the characteristics of the fluid being monitored; a further object being to provide appropriate probes adapted for immersion in the fluid to develop signals corresponding with the characteristics to be measured, such as NVM concentration, temperature, resistivity, pH value and the like, including the provision of circuitry for applying such signals for the control of apparatus for delivering coating bath constituents into the bath; a further object being to provide for applying the generated signals for the operation of a recorder adapted to indicate the condition of the bath in terms of its measured characteristics; a still further object being to provide for applying the developed signals successively to the recorder.

Another important object is to provide for circulating the fluid to be monitored continuously and preferably at a constant flow rate, through a monitoring channel or conduit, past test probes exposed in the channel.

A further object is to provide circuitry for measuring electrical characteristics of the fluid being monitored between a pair of probe forming electrodes.

Another object is to provide measuring circuits operatively associated with a probe to develop signals corresponding with the extent by which the bath characteristic measured by each probe deviates from a desired level or value.

A still further object of the invention is to apply signals, delivered at the output of a measuring circuit, for the actuation of an optical meter adapted to open and close control circuits in response to the deviation of the measured bath characteristic from a desired optimum condition.

Another important object is to provide, in conjunction with suitable testing probes, high frequency electronic equipment for detecting changes in NVM concentration in a liquid bath, as well as temperature, resistivity, and the pH characteristics of the bath; a further object being specifically to provide for measurement of such characteristics in coating baths of the sort now commonly employed in applying pigmentatious material upon objects to be coated, such as, for example, automobile bodies.

The foregoing and numerous other important objects, advantages and inherent functions of the invention will become apparent as the same is more fully understood from the following description, which, taken in conjunction with the accompanying drawings, discloses a preferred embodiment of the invention.

Referring to the drawings:

FIG. 6 is a perspective view of a monitoring conduit and a probe for the determination of NVM concentration, which forms a component of the equipment shown in FIG. 1;

FIG. 7 is a perspective view similar to FIG. 6 showing a modified form of probe;

FIG. 8 is a circuit diagram showing a thermistor mounted in a monitoring conduit, and circuitry associated with the thermistor for measuring the temperature of fluid flowing in the conduit;

Figure 1:
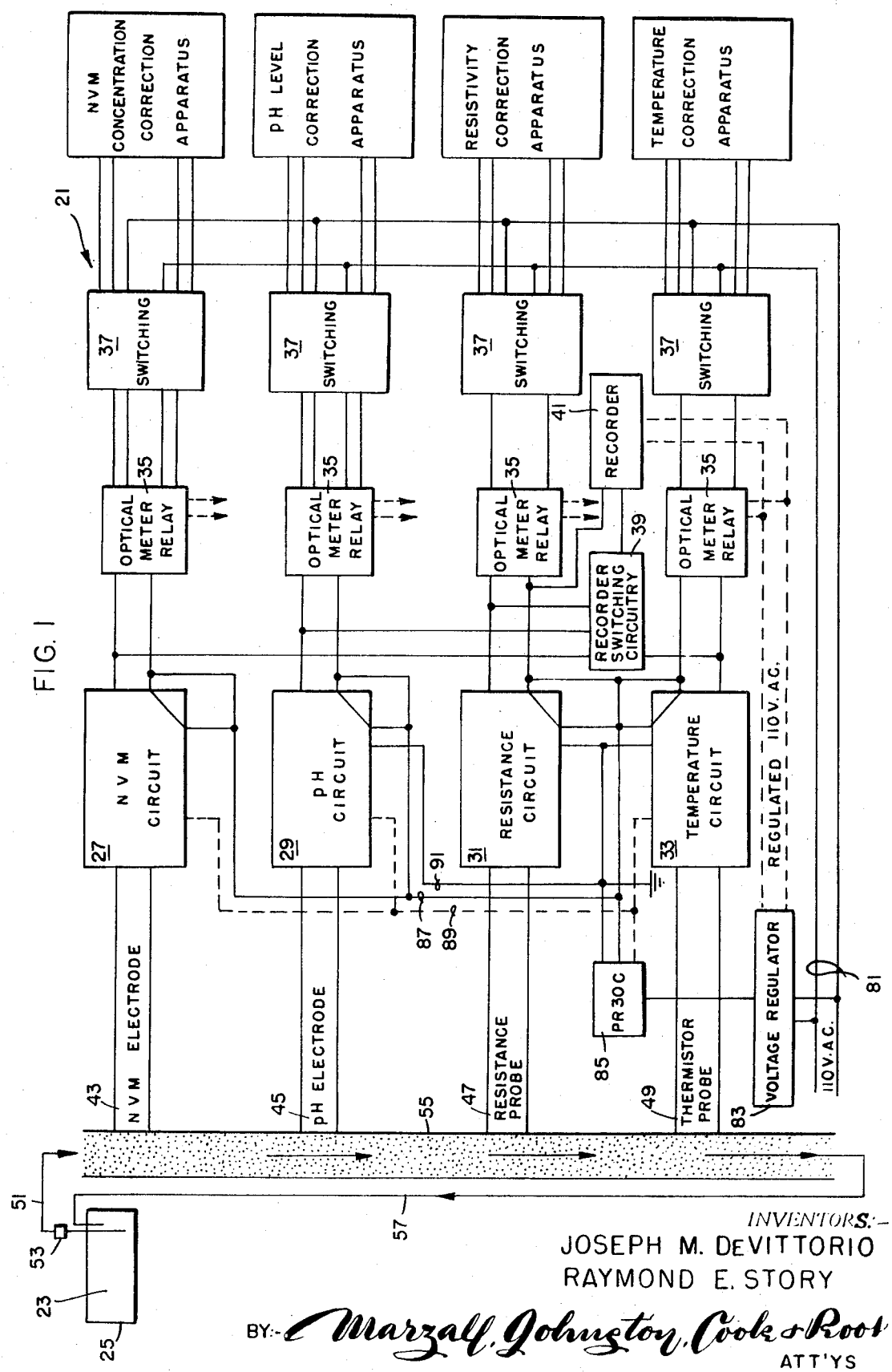
FIG. 1 is a diagrammatic showing of an electrical system for measuring the temperature, resistivity, pH level and NVM concentration in a bath, such as a coating bath, in accordance with the teachings of the present invention.

To illustrate the invention, the drawings show a system 21 for maintaining desired conditions such as temperature, resistivity, pH value and NVM content of a fluid mixture 23 of the sort forming a bath in a tank 25, in which non-volatile material may be applied for electrodeposition upon an article to be coated. The system 21 preferably embodies detecting means or probes 43, 45, 47 and 49, respectively, adapted to continuously monitor the NVM concentration, pH level, resistivity and temperature prevailing in the bath material, and signal generating means 27, 29, 31 and 33, controlled by the detecting means for producing signals corresponding with such prevailing conditions.

The non-volatile constituents of the bath mixture will, of course, become progressively depleted unless provision be made for replenishing the bath with non-volatile material to replace that removed by deposition on the article being coated. Furthermore, in order to promote uniformity of deposition, it is desirable to maintain, in the bath, not only uniform NVM concentration, but also uniform temperature, as well as uniform electrical resistivity and constant pH level in the fluid bath mixture; and, the present invention includes the provision of apparatus operable to keep the material of the bath at desired NVM concentration, resistance, pH and temperature levels.

When NVM concentration is low in the bath, the NVM circuit 27 produces a signal to start a proportionating pump P-1 (FIG. 14) in operation to delivery, into the tank 25, from a suitably supply source, a predetermined quantity of NVM make-up material. Thereafter, following a time interval sufficient to allow the added material to reach equilibrium of diffusion in the tank 25, the detecting means 43 of the system may again cause the pump to operate, if the NVM concentration should at that time be still too low. If, however, at such time, NVM concentration is within a correct range, no signal will be sent and the pump will continue inactive. Should NVM concentration become unduly high, the sensor 43 will produce a signal controlling the operation of a pump for delivering deionized or distilled water from a suitable source into the tank 25, to thereby reduce NVM concentration, without affecting the pH level of the fluid mixture in the bath.

Should the pH level of the fluid mixture 23 fall below a desired minimum, the pH sensor 45 will cause the signalling circuit 29 to produce a signal applicable to operate a pump for delivering basic corrective material, such as amine, lithium hydroxide or like substance having an alkaline reaction from a suitable supply source into the tank 25 to increase the pH level of the fluid mixture 23. Per contra, the signal produced by the circuit 29, when the sensor 45 indicates a pH level higher than a desired maximum, may be applied for the operation of a pump for circulating the bath material 23, through suitable deionizing apparatus, and thence back to the tank, until the pH level shall have been brought within the desired operational range.

Should the electrical resistivity of the fluid mixture 23 rise above a desired maximum, the resistivity sensor 47 actuates the signalling circuit 31 to produce a signal for application to operate a pump for delivering basic corrective material from a suitable source into the tank 25 to decrease resistivity. Per contra, the signal produced by the circuit 31, when the sensor 47 indicates resistivity below a desired minimum value, may be applied for the operation of a pump for circulating the bath material 23 through suitable deionizing apparatus and back to the tank, until the resistivity shall have been brought within a desired operational range.

In order to regulate the temperature of the bath fluid and hold it within desired limits, a heat exchange may be provided together with a pump for circulating material from the tank through the heat exchanger and back to the tank continuously whenever the pump is in operation. Suitable selectively operable means may be provided for heating or cooling the heat exchanger whenever the temperature of the bath material becomes too cool or too warm, to thereby maintain the bath within the desired temperature limits.

The several measuring circuits 27-33 are each adapted to develop signals corresponding with the characteristic of the fluid as measured by the circuits. The so developed signals may be applied to actuate corresponding relays 35, operable, in conjunction with suitable switching means 37, to activate corrective apparatus adapted to maintain the bath fluid in the tank 25 in desired condition with respect to NVM and liquid carrier content, as well as variable bath conditions, such as pH value, resistivity, temperature and the like. Switch means 39 may also be provided for applying signals, delivered by the circuits 27-33, in more or less rapid succession to suitable recording means 41 adapted to provide a continuous record of the several measured conditions of the fluid.

To monitor the tank fluid 23, sampling means is provided for applying sample portions thereof to test probes 43, 45, 47 and 49, respectively, associated with the measuring circuits 27, 39, 31 and 33. As shown, such sampling means may comprise a pipe 51 through which a pump 53 may draw sample fluid continuously from the bath and deliver the so withdrawn fluid into and through a monitoring conduit 55 containing the test probes 43-49, the fluid being delivered thence, if desired, to the tank 25, through a return pipe 57.

In flowing through the conduit 55, the liquid being monitored may be delivered successively past the probes 43, 45, 47 and 49, respectively adapted to operate in conjunction with the measuring circuits 27, 29, 31 and 33 to determine the NVM concentration of the fluid as well as its pH level, resistivity and temperature. If desired, probes and associated measuring circuitry may be provided for determining other variable characteristics, such as the dielectric quality of the fluid being monitored. Obviously, the bath fluid could be sampled for test purposes otherwise than by circulation through the monitoring or testing conduit 55; but the arrangement shown is preferred since it isolates the probes electrically and physically from the bath and provides a standard unchanging relation of the probes with respect to the monitored material independent of and free from that of the bath.

The monitoring conduit 55 preferably comprises a tube of non-conducting, preferably transparent material, such as glass or plastic, including, more especially, epoxy resin. The tube preferably has length and diameter such that any electrical charge that may prevail in or at the bath, as a result of the application of an electromotive force to cause electrodeposition on the object being coated, will not affect the operation of the monitoring apparatus. Typically, as disclosed in application, Ser. No. 467,919 filed June 29, 1965, the conduit can be a plastic tube one-quarter inch in inner diameter by 48 inches long.

As shown in FIGS. 6 and 7, the NVM electrode probe 43 may comprise a pair of spaced apart insulated electrodes mounted in position extending within the conduit 55. As shown in FIG. 6, the insulated electrodes may comprise varnish coated wires 59 disposed in transversely spaced relation in the conduit 55; and said electrodes, if desired, may be arranged and mounted in the conduit as disclosed in the copending application of Joseph M. DeVittorio, Ser. No. 467,919, filed June 29, 1965, now matured into U.S. Pat. No. 3,475,316. If desired, the electrodes, as shown in FIG. 7, may comprise a pair of mercury filled capillary tubes 61, preferably of glass, having walls of the order of 0.005 inch in thickness and outer diameter of the order of 0.06 inch. The tubes may have length of the order of 3 inches and may extend in parallel relation, in the conduit 55, spaced apart a distance of the order of 0.02 inch. The tubes 61 are each closed at one end and have a lead wire sealed in the opposite end.

Figure 4:
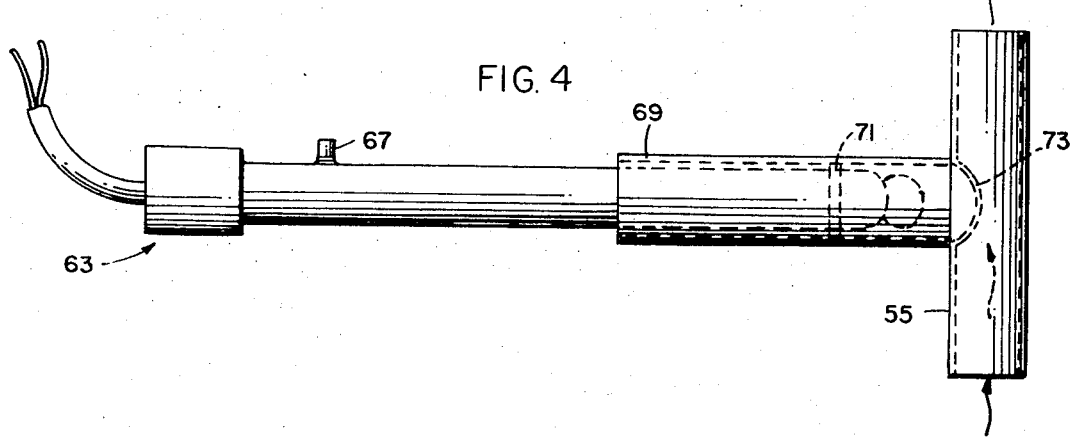
FIG. 4 is a perspective view of a monitoring conduit and an associated probe for determining the pH value of fluid flowing in the conduit.
Figure 5:
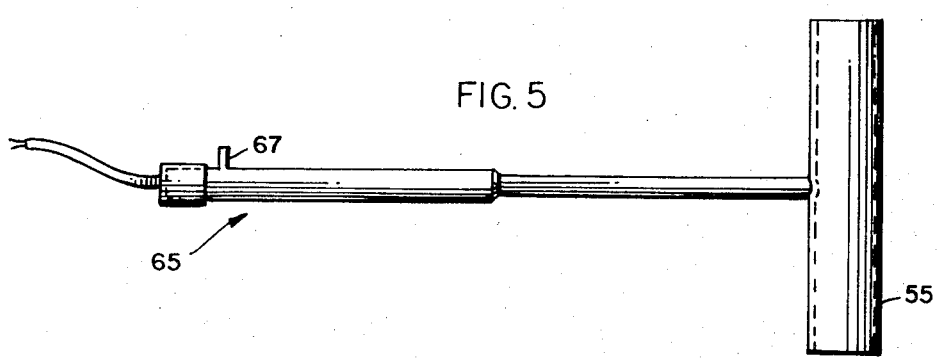
FIG. 5 is a perspective view similar to FIG. 4 illustrating a modified form of probe.

The electrode probe 45 for determining the pH level of the fluid being monitored may comprise conventional pH probes, such as the No. S-30072-15 pH Electrode Probe 63, (FIG. 4), or the No. 39030 pH Electrode Probe 65, (FIG. 5). These probes comprise housings forming separated chambers each containing an electrode adapted for exposure, one to the fluid being monitored and another to a reference fluid, such as potassium chloride saturated with silver chloride, which may be charged into the probe through an inlet tube 67 formed on the probe.

As shown in FIG. 4, the monitoring conduit 55 may be formed with an outwardly extending stub sleeve 69 sealed at one end to and in open communication with the conduit, the other end of the sleeve being open and sized to snugly receive the tip of the probe therein. A seal ring 71 may be applied in the sleeve around the probe to seal against leakage of fluid from the conduit 55 through the sleeve 69 past the sleeve mounted tip of the probe. If desired, the tip end of the probe may be exposed directly to the fluid in the conduit 55, or, as shown, a porous membrane 73, conveniently of regenerated cellulose, may be applied across the conduit connected end of the sleeve 69, to eliminate the possibility of clogging the probe tip as might otherwise result from intimate contact of the probe tip directly with the non-volatile material components of the fluid in the conduit. As shown in FIG. 5, the tip of the probe 65 is sealed in a lateral opening in the wall of the conduit 55 to thus present the probe tip directly in the fluid in the conduit.

Figure 2:
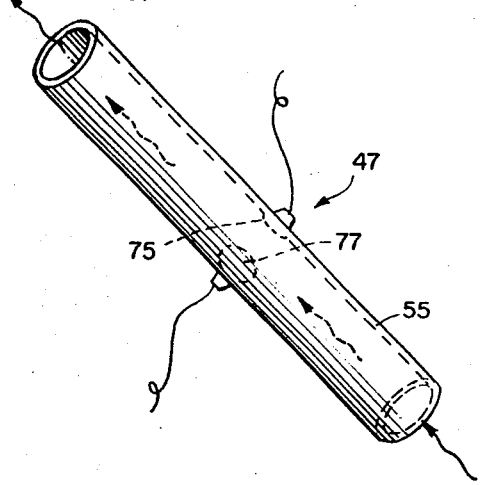
FIG. 2 is a perspective view of a monitoring conduit through which fluid to be monitored may be caused to flow between spaced conductors of a probe for measuring resistivity, the same forming a component of the equipment shown in FIG. 1.
Figure 3:
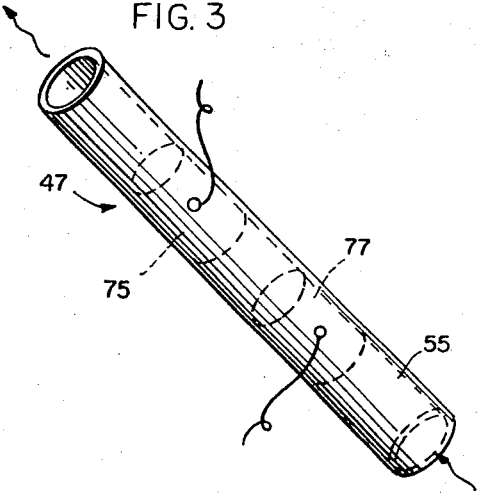
FIG. 3 is a perspective view similar to FIG. 2 illustrating a modified form of probe.
Figure 9:
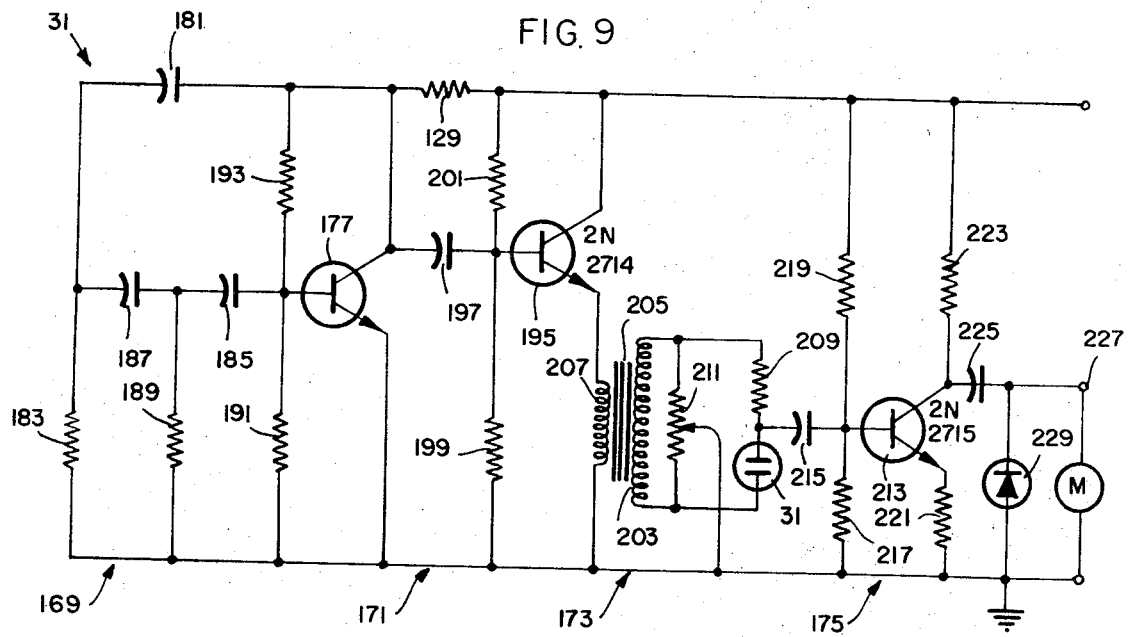
FIG. 9 is a circuit diagram of an electrical translation system that may be associated with probes of the sort shown in FIGS. 2 and 3 to provide a signal corresponding with the resistivity of the fluid passing the probe in the conduit.

As shown more especially in FIGS. 2 and 3, the resistance measuring probe 47 may comprise a pair of metal electrodes 75 and 77 mounted upon and exposed within the conduit 55 and connected with conductors 75' and 77', respectively extending outwardly of the conduit for connection with the resistance measuring circuitry shown in FIG. 9. As shown in FIG. 2, the electrodes may comprise a pair of screw heads disposed in diametral opposition on and molded into the conduit walls, or, if desired, as shown in FIG. 3, the electrodes may comprise a pair of preferably brass sleeves molded in the walls of the conduit in longitudinally spaced relation. In either case the inner surfaces of the electrodes are preferably flush with the inner surfaces of the conduit, so that fluid flow therein will not be impeded by the electrodes.

As shown in FIG. 8 of the drawings, the temperature probe 49 may comprise a thermistor 79 mounted preferably centrally in the monitoring tube 55 and connected with conductors extending outwardly of the tube through suitable seals formed in the walls thereof, said conductors serving to interconnect the thermistor in a temperature measuring circuit. The thermistor 49 may conveniently comprise a device of the sort rated 2,000 ohms at 25° C. Other thermistors may, of course, be employed in this environment.

The pump 53 for continuously circulating sample fluid from the tank 25 through the monitoring conduit 55 may conveniently comprise an oscillating pump driven by half-wave rectified alternating current energy applied to the actuating coil of the pump preferably at a frequency of the order of 60 cycles, in order to magnetically oscillate an armature, the lumen of which embodies a one-way check valve. The resulting pulsed flow of fluid may be varied as by providing an adjustable flow restricting orifice in the discharge pipeline 51 from the pump, or otherwise, as by varying the voltage at which actuating energy is supplied to the pump.

Electrical power for the operation of the signalling circuits 27, 39, 31 and 33, the optical meter relays 35, and the switching circuitry 37 and 39 may be supplied from a conventional 110 volt AC supply line 81 through a voltage regulator 83, which in turn may be employed to energize a power supply netword 85 adapted to delivery DC energy at plus and minus 15 volts, with respect to ground, respectively, through positive, negative and grounded conductors 87, 89 and 91. The network 85 may conveniently comprise a power supply unit of the sort identified commercially as a Pr-30C unit.

Figure 11:
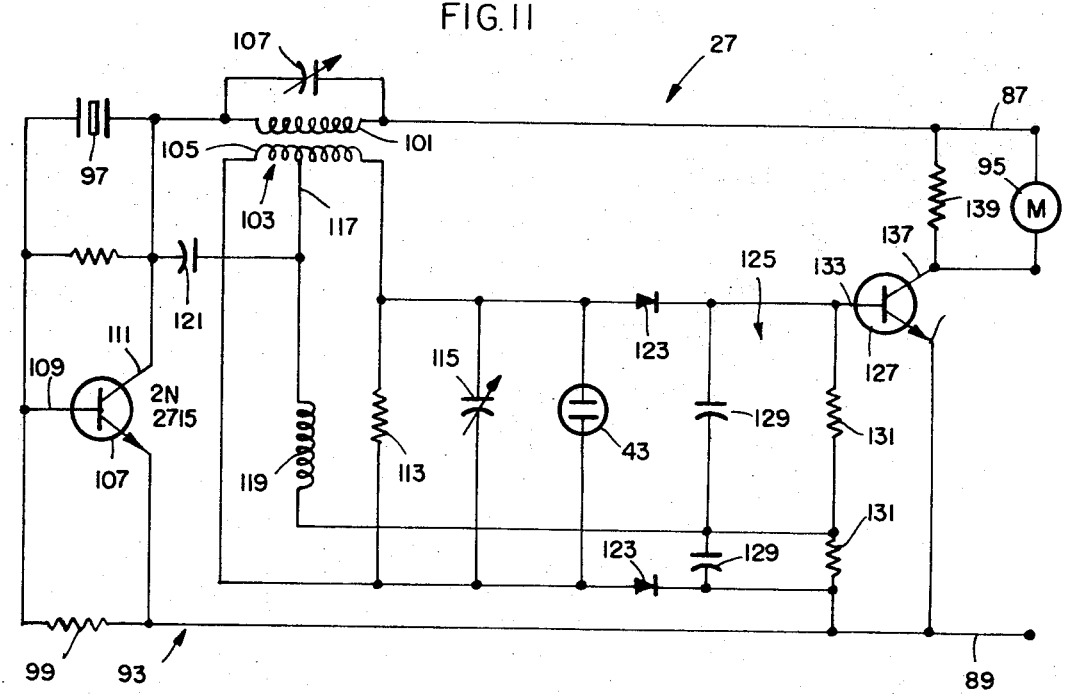
FIG. 11 is a circuit diagram of an electrical system that may be associated with probes of the sort shown in FIGS. 6 and 7 to develop a signal corresponding with the extent by which the NVM concentration of fluid flowing in the conduit varies from a desired norm.

The NVM measuring circuit may be of the sort disclosed in copending U.S. Pat. application, Ser. No. 467,919, filed June 29, 1965, now U.S. Pat. No. 3,475,316, wherein an electric signal is applied as a stimulus between two probes and the dielectric response of the sample to such stimulus is measured. The circuit as shown in FIG. 11 may comprise oscillating circuitry 93 for applying a potential difference upon the NVM cell 43, so that the applied potential may be modified or modulated, in accordance with the NVM concentration in the sample being examined, to produce a signal for driving an NVM concentration indicating meter 95 or other device desired to be actuated in accordance with the NVM concentration in the sample under examination. As shown, the oscillating circuitry 93 may conveniently comprise a 27 megacycle oscillating crystal 97 connected between the plus and minus 15 volt output conductors 87 and 89 of the PR-30C DC power supply unit 85, in series with a preferably 47 kilohm registor 99, connected between the crystal 97 and the minus 15 volt conductor 89, and the primary winding 101 of a transformer 103 connected between the crystal 97 and the plus 15 volt conductor 91, said transformer having a secondary winding 105, and a preferably 50 picofarad tuneable condenser 107 being connected between the opposite ends of the primary winding 101. The primary and secondary windings of the transformer preferably embody 25 turns in the primary winding 101 and 12 turns in the secondary winding. The oscillating circuitry may also comprise an NPN-transistor 108 having its base 109 connected with the interconnected sides of the crystal 97 and the resistor 99, the collector 111 of the transistor 108 being connected with the interconnected sides of the crystal 97 and the transformer winding 101, while the transistor emitter 110 is connected with the minus 15 volt connected end of the resistor 99, a preferably 220 kilohm resistor being connected between the base 109 and collector 111 of the transistor, that is to say, with the opposite sides of the crystal 97.

The opposite ends of the secondary winding 105 of the transformer are connected with the opposite sides of the NVM probe electrode 43, a preferably 1 kilohm resistor 113 and a variably adjustable preferably 50 picofarad condenser 115 being connected in parallel relation with respect to the cell 43 across the opposite ends of the transformer winding 105. The secondary winding of the transformer is preferably provided with a center tap 117 which is connected with one end of an impedence or choke coil 119 preferably comprising 40 turns of wire, a preferably 150 picofarad condenser 121 being connected between the collector 111 of the transistor and the center tap 117.

The opposite sides of the probe electrode 43 are connected through rectifiers 123 and a resistance-capacitor network 125 for the operation of a preferably NPN-transistor 127 as an amplifier for driving the meter 95, said network 125 comprising a pair of preferably 150 picofarad capacitors 129 connected with the transformer remote end of the choke coil 119 and the output sides of the rectifying units 123, respectively, a pair of preferably 47 kilohm resistors 131 being connected in parallel relation each with a corresponding one of the capacitors 129. The rectifier connected ends of the network 125 are preferably connected one with the base connection 133 of the transistor 127 and the other with the minus 15 volt line 89, the emitter 135 of said transistor being likewise connected with the minus 15 volt line, while the collector 137 of the transistor may be connected through the meter 95 to the plus 15 volt line 87, a preferably 4.7 kilohm resistor 139 being connected in parallel with the meter 95 between the collector of the transistor and the plus 15 volt line 87.

Figure 13:
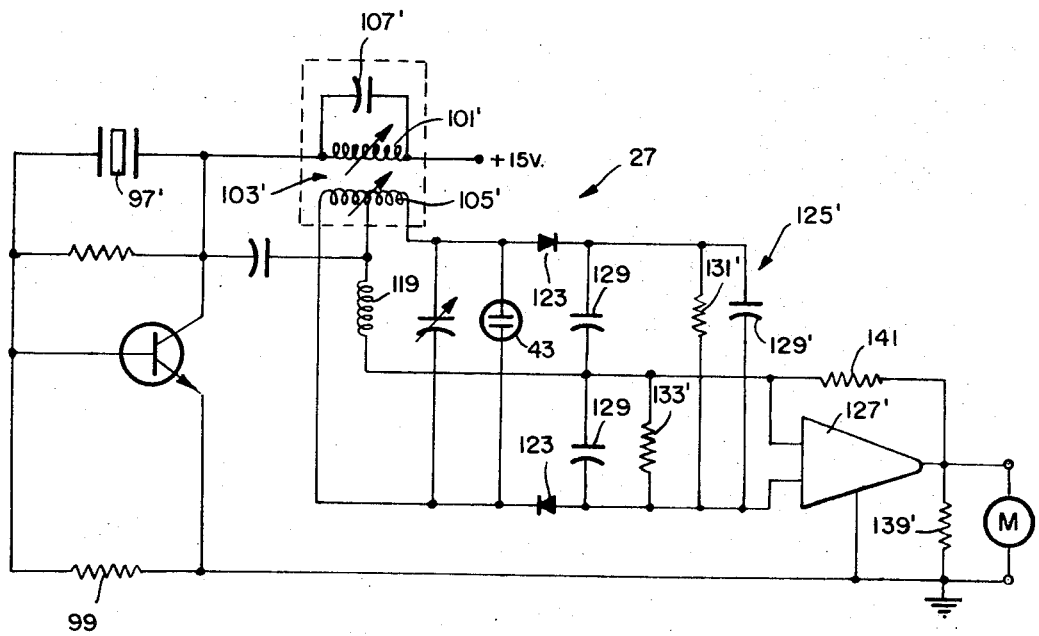
FIG 13 is a circuit diagram functionally similar to the diagram shown in FIG. 11, but containing a high gain solid state amplifier, which may be used in the system in place of the circuit shown in FIG. 11.

A modified NVM circuit is shown in FIG. 13 of the drawings and, like that shown in FIG. 11, is an oscillator driven amplifying system. In the FIG. 13 embodiment, a fixed capacitor 107' is substituted for the variable capacitor 107, and a slug-tuned transformer 103' having a core relatively shiftable with respect to the coils or windings 101' and 105' may be substituted for the transformer 103 as shown in FIG. 11 embodiment. The resistor 113, which is connected across the opposite ends of the secondary winding of the transformer in the FIG. 11 embodiment, to reduce the Q value of the circuit, is omitted in the FIG. 13 embodiment, and a 10.7 megacycle oscillating crystal 97' is employed in the FIG. 13 embodiment as distinguished from the 27 megacycle crystal used in the FIG. 11 embodiment. The network 125, the amplifying transistor 127 of the FIG. 11 embodiment are replaced in the FIG. 13 embodiment by a resistance capacitor network 125' and a high gain solid state amplifier 127', said network 125' embodying a preferably 110 kilohm resistor 131' and a preferably 10 microfarad capacitor 129' interconnected in parallel relationship between the output sides of the rectifiers 123, and a resistor 133' connected across the base conductors of the amplifier 127', said base conductors being connected between the variocoupler remote end of the RF choke and one of the rectifiers 123. The crystal remote end of the resistor 99 is connected to ground in the FIG. 13 embodiment and said grounded side of the circuit is connected with the solid state amplifier and forms one side of its output, a resistor 139' being connected across the output and a resistor 141 being connected between the transformer remote end of the choke coil 119 and the ungrounded or high side of the output.

Figure 10:
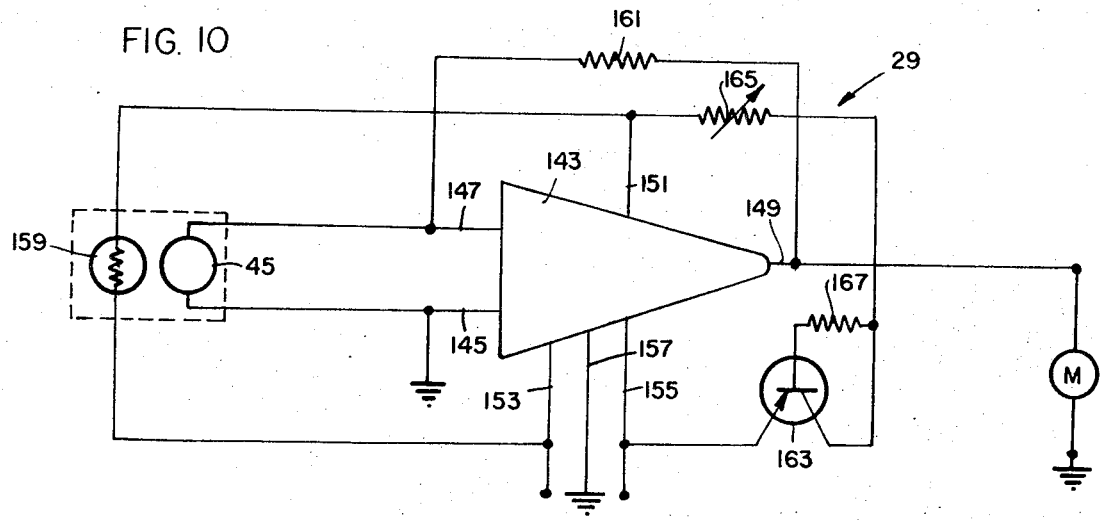
FIG. 10 is a circuit diagram of an electrical system that may be associated with probes of the sort shown in FIGS. 4 and 5 to provide a signal corresponding with the pH value of fluid flowing in the conduit past the probe.

As shown in FIG. 10, the pH signal developing circuit 29 may embody a solid state amplifier 143 which may conveniently comprise model PP25A, the same being a cast epoxy differential amplifier having extremely high input impedance and low input current, the same embodying hermetically sealed silicon semiconductors. The amplifier 143 may have a pair of input conductors 145 and 147, an output conductor 149, a trim terminal 151, negative and positive voltage terminals 153 and 155 and a grounding terminal 157. The lead conductors of the pH electrode probe 45 may be connected between the input terminals 145 and 147 of the amplifier 143, the input terminal 145 being preferably grounded. A preferably 500 kilohm thermistor 159 which is disposed in heat exchange relation with the fluid traveling the monitoring conduit 55, in the vicinity of the pH electrode probe 45, may be interconnected between the trim electrode 151 and the negative potential electrode 153 of the amplifier 143, the impedence of the thermistor 159 being preferably matched with that of the probe as indicated by the broken line box enclosing the probe and thermistor units in FIG. 10. A preferably 50 megohm resistor 161 may be interconnected between the output terminal 149 and the input terminal 147 of the amplifier 143, such feedback resistor performing essentially the same function as a normal voltage feedback, but affords very high input impedance, such feedback being termed negative feedback, the same constituting a technique whereby all or part of the output of an amplifier is combined with the input in such fashion as to reduce the magnitude of the input. The disposition of the thermistor 159 adjacent the probe 45 is to provide compensation for variations in temperature at the electrode probe, which is of the order of four times more sensitive to temperature variation as compared with the sensitivity of the circuit as a whole to temperature fluctuations. A preferably PNP-transistor 163 is connected in series with a preferably 5 kilohm variable trim resistor is connected between the plus 15 volt terminal 155 and the trim terminal 151 of the amplifier 143, the collector of the transistor being electrically connected with the variable trim resistance. The transistor base being connected with the collector through a preferably 1 kilohm resistor 167, the emitter of the transistor being connected with the positive voltage terminal of the amplifier. The pH circuit shown in FIG. 10 may be energized for operation by connection of the negative and positive electrodes 153 and 155 with the negative and positive output conductors 89 and 87 on the PR30C power supply unit 85. The transistor 163 serves as a variable trim resistance, the value of which is directly proportional to circumambient temperature. The circuit shown in FIG. 10 exhibits a negative temperature coefficient so that, in order to compensate for change in value of the output signal, at constant input, as temperature varies, the transistor 163 is employed as an electronic thermocompensating device.

As shown more especially in FIG. 9 of the drawings, the resistance signal developing circuit 31 comprises an oscillator 169 having an output frequency of the order of 1,000 cycles per second, the oscillator being connected to drive an oscillator amplifier 171 which in turn feeds a sensing bridge 173 and a bridge signal amplifier 175. The oscillator 169 may conveniently comprise an NPN-transistor 177 having its emitter connected to ground and its collector connected with a suitable source of energizing potential, such as the positive voltage output conductor 87 of the power supply unit 85, through a preferably 15 kilohm resistor 179. The collector of the transistor is also connected to ground through a preferably 0.01 microfarad capacitor 181 in series with a preferably 4.7 kilohm resistor 183, while the base of the transistor is connected to ground through said resistor 183 and a pair of preferably 0.01 microfarad capacitors 185 and 187 connected in series between the base of the transistor and the interconnected ends of the capacitor 181 and resistor 183, the interconnected ends of the capacitors 185 and 187 being connected to ground through a preferably 10 kilohm resistor 189, while the base of the transistor is connected to ground through a preferably 22 kilohm resistor 191 and through a preferably 470 kilohm resistor 193 to the junction of the capacitor 181 with the resistor 179 and the collector of the transistor.

The amplifier 171 may comprise an NPN-transistor 195 having its collector connected with a suitable power source such as the positive potential output conductor 87 of the power supply unit 85, the base of the transistor 195 being coupled with the collector of the transistor 177 as through a preferably 0.001 microfarad capacitor 197, said base being also connected to ground through a preferably 22 kilohm resistor 199 and through a preferably 220 kilohm resistor 201 with a power source such as that with which the collector of the transistor is connected.

The bridge 173 comprises the secondary winding 203 of a transformer 205, such as a Stancor TA27 coupling transformer having a primary winding 207 electrically connected between ground and the emitter of the amplifying transistor 195. The electrodes of the resistance probe 31 are connected in series with a preferably 2.7 kilohm resistor 209 between the opposite ends of the secondary winding 203 of the transformer, the resistance element 211 of a potentiometer being also interconnected between the opposite ends of the winding 203, the adjustable contact element of the potentiometer being connected to ground.

The signal amplifier 175 may conveniently comprise an NPN-transistor 213 having its base coupled with the bridge through a preferably 0.01 microfarad coupling condenser 215, one side of which is connected with the base of the transistor 213, while its other side is connected with the bridge circuit between the resistor 209 and the probe 31.

The base of the transistor 213 may be connected to ground through a preferably 15 kilohm resistor 217 and with a suitable source of power such as the positive 15 volt output conductor 87 of the power unit 85 through a preferably 220 kilohm resistor 219. The emitter of the transistor 213 may be connected to ground through a preferably 0.47 kilohm resistor 221 while its collector may be connected through a preferably 4.7 kilohm resistor 223 with the power source provided by the positive 15 volt output conductor 87 of the power supply unit 85. A preferably 0.01 microfarad condenser 225 is connected between the collector of the transistor 213 and an output terminal 227, a rectifier 228 being interconnected between ground and the output terminal 227.

As shown more particularly in FIG. 8 of the drawings, the temperature signalling circuit 33, in addition to the temperature probe 49, may comprise a thermistor bridge circuit operated from the power supply unit 85, in which circuit the negative 15 volt output from the power supply is applied, at a balancing terminal 229, through a preferably 270 kilohm resistor 231, a preferably 80 kilohm adjustable resistor 233 and the thermistor element 79 of the probe 49, the positive 15 volt output of the unit 85 being connected with the balancing terminal 229 through a preferably 330 kilohm resistor 235. Accordingly, the negative and positive potentials will balance and be mutually cancelled at the terminal 229 when the sum of the resistance values of the elements 79, 231 and 233 equal the resistance value of the element 235. Any thermally induced change in the resistance value of the thermistor element 79 will, of course, be shown as a corresponding potential on the terminal 229 with respect to ground, whereby said terminal constitutes the signal output of the temperature signal developing circuit 33. If desired, a suitable temperature indicating meter may be connected with said output, as shown in FIG. 8, or recording means may be connected, or the output of the circuit 33 may be connected to control the operation of a corrective device, such as heating or cooling apparatus, or both, for controlling the temperature of the fluid in the bath 25.

As indicated in FIG. 1 of the drawings, the signals delivered by the several signal developing circuits 27, 29, 31 and 33 may be applied for the operation of preferably optical meter relays 35 and thence through suitable switching mechanism 37 for the operation of a corrective network (not shown) comprising suitable apparatus for having non-volatile material and water or other carrier liquid in the bath from time to time as required to maintain the bath at optimum NVM concentration and pH and resistivity levels, and to maintain a desired temperature level in the bath. As shown more particularly in FIG. 12 of the drawings, each of the optical meter relays 35 may comprise a relatively movable dial and pointer for visual indication and an actuating coil 237 for driving the indicator. Each meter may also embody a light source which may conveniently comprise a lamp 239, preferably one of the sort adapted to be energized from an AC electrical power source at any preferred or convenient voltage, the lamp 239 being mounted in position to apply emitted light upon a pair of photosensitive cells 241 and 243 adapted, respectively, to function as low and high limit cells. A movable shutter 245 is provided for selectively screening the cells 241 and 243 from lamp emitted light, said shutter being shiftable by the actuating coil 237 to expose the low and high limit cells 241 and 243 to lamp emitted light, respectively, when the signal delivered by the connected signal developing circuit shows the monitored characteristic to be below or above the desired optimum level. The photosensitive cells 241 and 243 may, respectively, be connected to control the operation of corresponding low and high limit relays 246 and 247, each embodying a single pole double throw switch 246-S and 247-S and a switch actuating solenoid or coil 246-C and 247-C, the low and high limit photosensitive cells 241 and 243 being, respectively, connected in series with the actuating coils 246-C and 247-C across a suitable source of relay energizing power, as, for example, a 12 volt DC power source.

Figure 12:
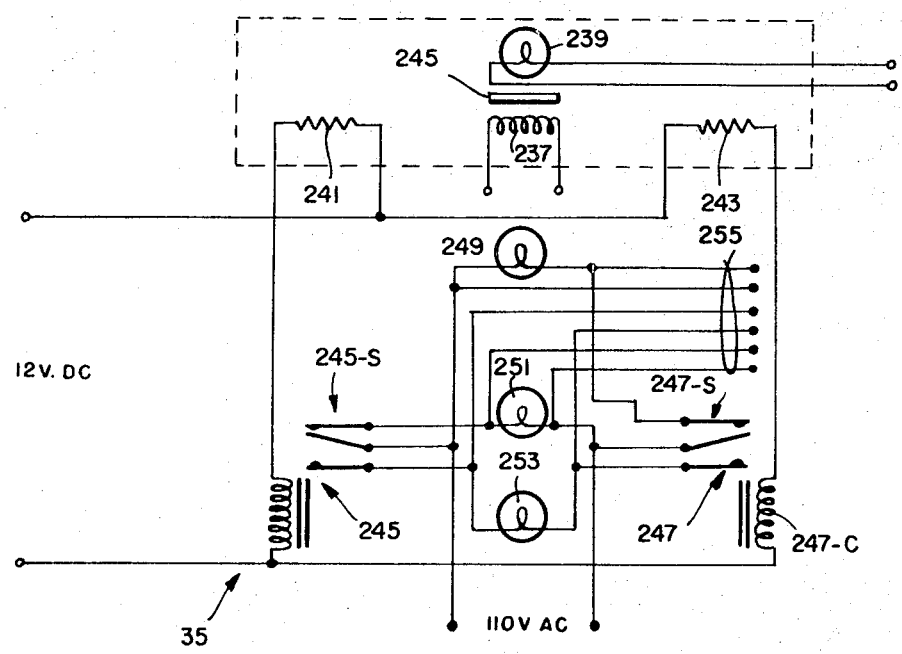
FIG. 12 is a circuit diagram of an optical meter of the sort employed in the apparatus shown in FIG. 1, in conjunction with the temperature, resistivity, pH and NVM concentration measuring circuits shown in FIGS. 8 through 11.

The relay switches 246-S and 247-S may each comprise a pair of stationary contacts O and C and a blade normally biased to engage one of the contacts such as the contact O to thereby provide a normally closed switch with said contact and a normally open switch with the contact C, the blade B being shiftable into engagement with the contacts C by operation of the relay coil when energized to thereby close the normally open switch and open the normally closed switch whenever and so long as the relay coil becomes and remains energized, the relay switches being shown in FIG. 12 in their relatively shifted positions in which the normally open switch of each contactor is closed when the coils are energized. Each optical relay meter 35 may also embody high, low and neutral, or normal indicators comprising telltale lamps 249, 251 and 253 to visually indicate the momentary condition of the monitored characteristics of the fluid in the bath 25; and to operate the telltale lamps, the same may be interconnected with the relay switches and with a suitable source of lamp energizing power, such as a conventional 110 volt AC source. As shown, the blades of the relay switches may, respectively, be electrically connected with the opposite sides of the energizing power source, the high indicator lamp 249 may be connected between the blade of the low limit relay switch 246-S and the normally open contactor O of the high limit relay switch 247-S, while the low indicator lamp 251 may be electrically connected between the blade of the high limit relay switch 247-S and the normally open contact O of the low limit relay switch 246-S, the neutral or normal indicator lamp 253 being electrically connected between the normally closed contactors of the relay switches.

The shutter 245 is arranged so that light from the lamp 239 may impinge upon both photocells 241 and 243 under normal or neutral conditions when the monitored characteristic of the bath fluid is at an optimum level. The photocells having maximum conductivity when illuminated permit current to flow in the relay coils, thereby permitting the relay switches to be held in position with their blades in engagement with the normally closed switch contactors C, thereby completing a lamp energizing circuit through the neutral or normal condition indicating lamp 253. If the monitored characteristic of the bath fluid decreases below or increases above the desired optimum, the shutter 245 will move into position screening the low limit cell or the high limit cell from the rays of the lamp 239. As light impingement on either of the photocells decreases, the flow of current through the cell and the connected relay coil will be progressively blocked until the relay switch blade B is released from engagement with the normally closed contact C and permitted to engage the normally open contact O. As a consequence, when the shutter 245 screens either of the photocells the corresponding relay switch will assume the position shown in FIG. 12 while the blade of the other relay switch will remain engaged with the contact C. The energizing circuit to the neutral indicator lamp 253 will thus be interrupted at one or other of the relay switches and the closure of the normally open contactor will complete a circuit either through the high indicator lamp 249 or through the low indicator lamp 251 depending upon which of the relays has been permitted to engage its blade with its normally open contact O. The relay contacts may also be wired into circuits 255 connected in parallel with the indicator lamps and hence energized from the power source along with the indicator lamps, said circuits 255 being connectable through the switching apparatus 37 to control the operation of the corrective network with which the equipment is associated.

Figure 14:
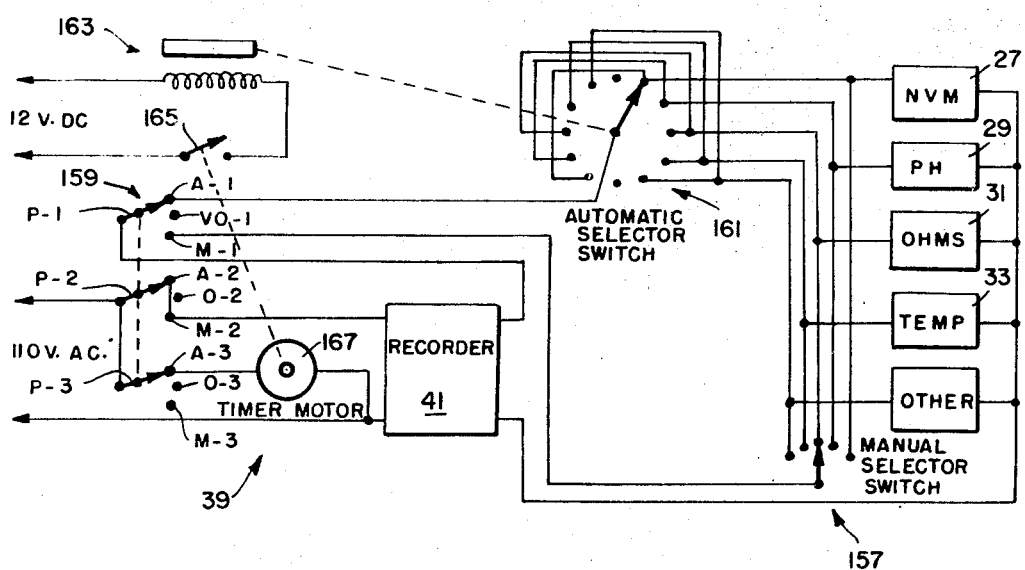
FIG. 14 is a diagram of connections forming a switching system for successively connecting a recorder for operation by signals delivered by the circuits shown in FIGS. 8 through 10 and 11 or 13.

Any suitable preferred or convenient recorder 41, such as a recorder embodying a Darsonval type of meter movement, may be employed to make a permanent record of the signals produced at the output sides of the circuits 27, 29, 31 and 33. To this end, the recorder switching circuitry 39 is designed so that any signal producing circuit, such as the NVM concentration, pH level, resistivity and temperature or other signal con be recorded individually during an interval of any desired length, or all signal channels may be recorded sequentially on a fixed time interval basis, and a suitable selector switching arrangement is shown in FIG. 14. For manual selection of the channel to be recorded, a single multiple position selector switch 157' may be employed, said switch being adjusted to connect a selected channel in recording relation with the recorder 41 after the main manual-automatic selector 159' has been set in position for manual channel selection. For automatic cycling, individual channels may be connected successively with the recorder 41 for desired intervals such as recording intervals of 5 minutes; and after the several channels have been recorded in sequence, the recorder may remain blank during an interval before the recording sequence is again initiated in order to obtain positive and accurate timing, the automatic rotary selector switch 161' may be driven by a stepping relay 163' controlled by a switch 165' that is drivingly connected with a synchronous timer motor 167' to close at intervals to actuate the coil of the stepping relay. As shown in FIG. 14, the several channels to be recorded may be electrically connected with the selector contacts of the manual and automatic selector switches 157' and 161', the channels being also commonly connected with the recorder. The main selector switch 159' may comprise a triple pole triple throw switch having poles P–1, P–2, and P–3 adjustable in unison into position to respectively engage stationary contacts A–1, O–1, M–1; A–2, O–2, M–2 and A–3, O–3 and M–3, in order to adjust the apparatus for "automatic," "off" and "manual" operation. The pole P–1 may be connected with one side of the actuating coil of the recorder 41, the other side of which coil is commonly connected with the selector switch remote sides of the outputs of the channels to be recorded. The contacts A–1 and M–1 may be electrically connected with the selector blades of the automatic and manual selector switches 161' and 157'. The recorder 41 may include an electrical motor, such as a synchronous motor, for driving at preferably uniform speed, the card or sheet upon which the record is made; and the switch poles P–2 and P–3 and their selectively engageable contacts are arranged to selectively interconnect the recorder motor and the timer motor 167' with a suitable source of operating power such as the 110 volt AC line shown in FIG. 14. To this end, one side of the supply line may be connected to one side of the timer motor 167' and to one side of the recorder motor. The other side of the recorder motor may be connected with the switch contact M–2 and thence through a jumper connection with the switch contact A–2, while the other side of the timer motor may be connected with the switch contact A–3. The switch blades P–2 and P–3 may be electrically interconnected together and with the other side of the power supply line. As a consequence, when the switch 159' is adjusted for automatic operation, both the timer motor and the recorder motor will be supplied with operating power. Since the switch contacts O are dead or disconnected contacts, the entire system will be inoperative when the switch 159' is adjusted to the "off" position. Since the switch contact M–3 also is disconnected, the timer motor 167' will be inoperative and only the recorder motor will be energized for operation through the switch contact M–2 when the switch 159' is adjusted for "manual" operation.

Figure 15:
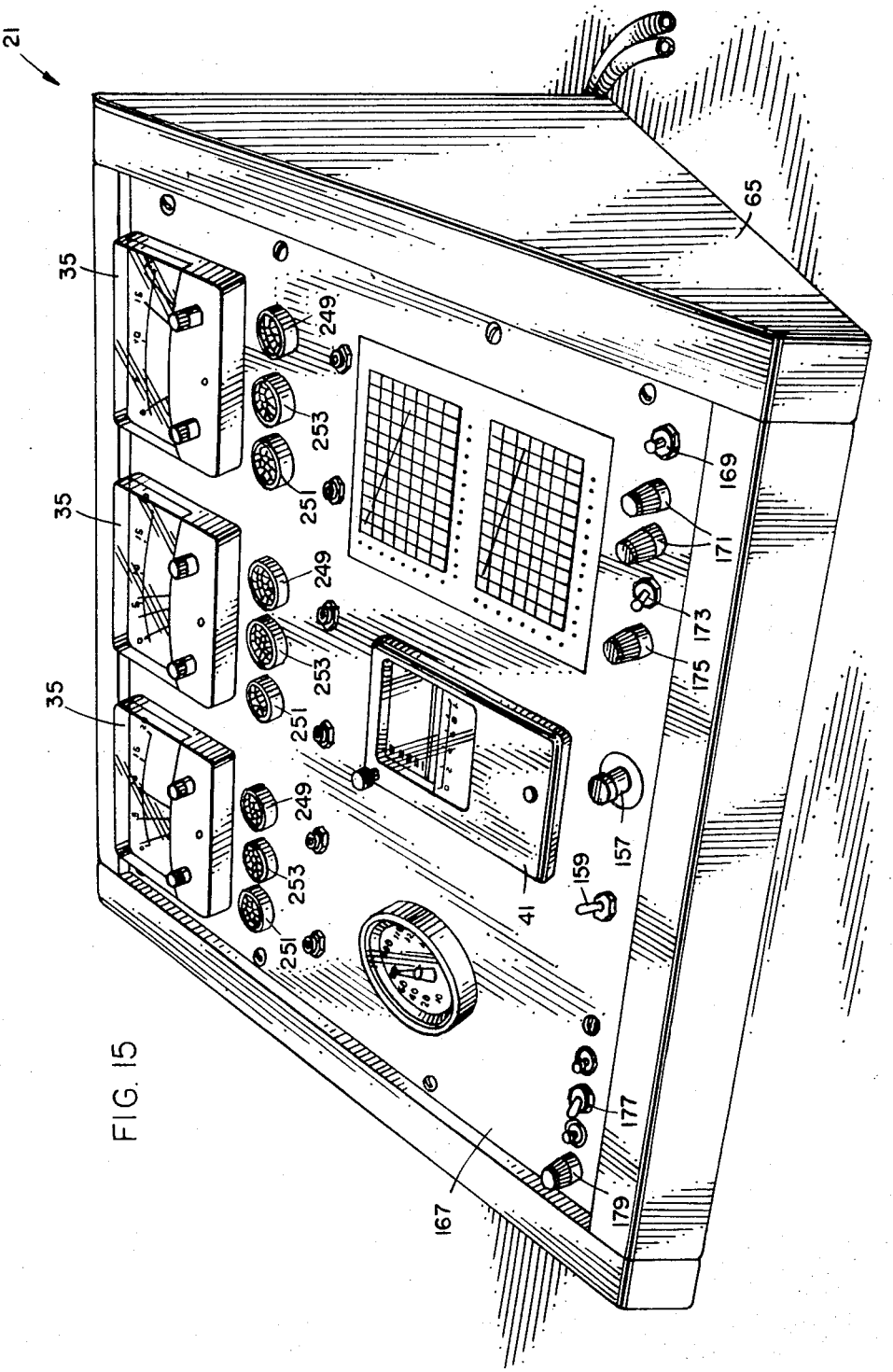
FIG. 15 is a perspective view showing a cabinet or console in which the apparatus shown in FIG. 1 may be mounted for convenient operation.
Figure 16:
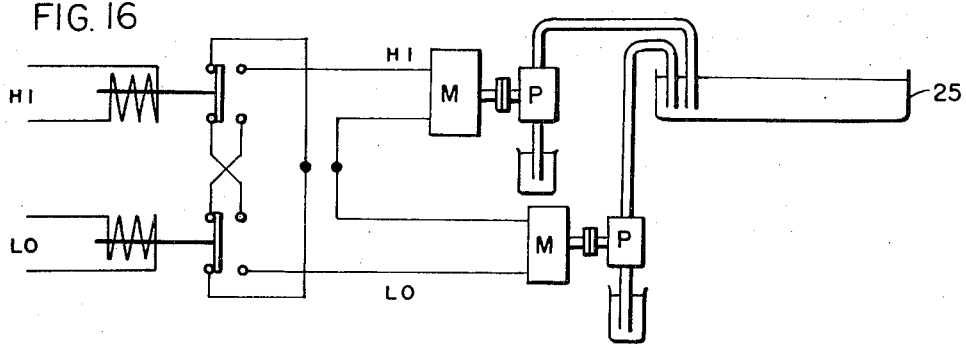
FIGS. 16, 17 and 18, respectively, are diagrammatic showings of apparatus for correcting NVM concentration, resistivity and pH values and temperature conditions prevailing in the bath.
Figure 17:
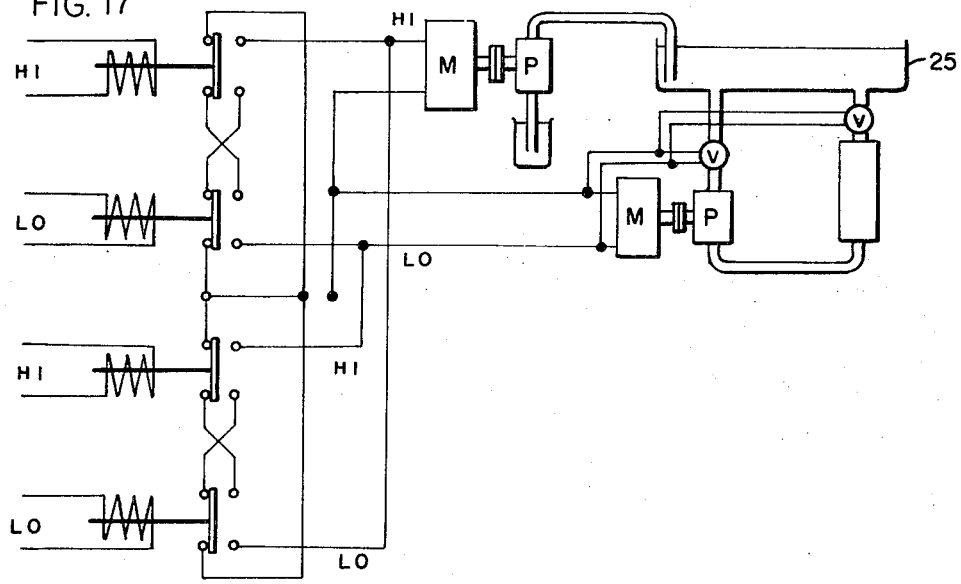
Figure 18:
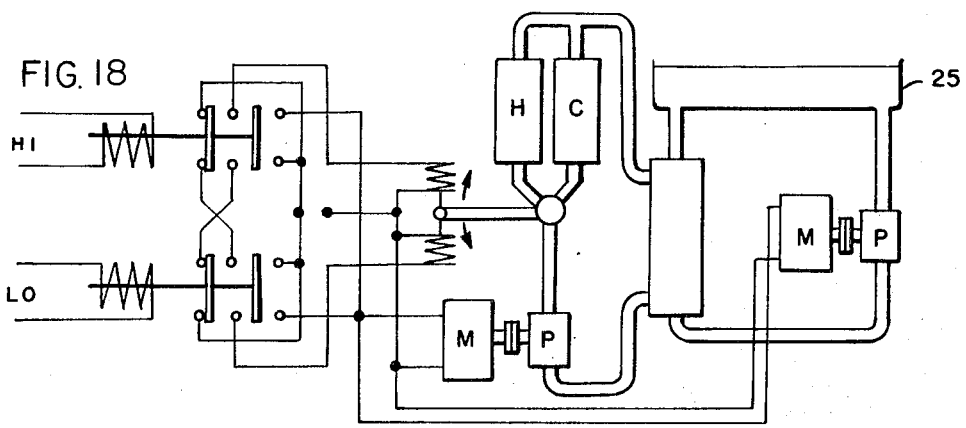

As shown more particularly in FIG. 15 of the drawings, the operation of the apparatus 21 may be accomplished from a control station comprising a cabinet 165" carrying an instrument panel 167" in readily accessible position upon which may be mounted in position to be viewed the optical meter relays 35, the high, low and normal indicating lamps 249, 251 and 253, the recorder 41, the operation selector switch 159', the manually operable selector switch 157', and several on-off switches and circuit protecting fuses including a master disconnect switch 169' and supply line fuses 171', a monitor control switch 173' and associated fuse 175' and a switch 177', and associated fuse 179' for controlling the operation of the pump 53. In addition to the components supported on the panel 167", the housing 165" may enclose and support the timer motor 167', the automatic selector switch 161' and its associated stepping relay 163', as will as the components forming the signal developing circuits 27, 29, 31 and 33, and the switching mechanism 37 if desired, although, obviously, the signal developing circuits as well as the switching means 37 may, if desired, be remotely located and electrically connected with the components in the cabinet 165" by means of suitable conductor cables.

The use of the invention in the electrodeposition of a paint is illustrated but not limited by the following example.

EXAMPLE

The following is an example of a monitor control run using a red oxide, acrylic paint of the following composition.

| | |
|---|---|
| Acrylic vehicle | 76.63% |
| Melamine vehicle | 5.61% |
| Ferric oxide | 13.06% |
| Butyl Cellosolve | 4.70% |

The composition of this material is 59.0 percent total solids.

The deposition bath is prepared by diluting this composition to 6.0 percent total solids with deionized water. A continuous steel strip is passed through this bath continuously and a coating of said paint is electrodeposited thereon while maintaining the following conditions:

| | |
|---|---|
| Temperature | 74°F. |
| Voltage | 200 VDC (volts, direct current) |
| Amperage | 5.2 amps. |
| Current Density | 2.0 amps./sq. ft. |

A portion of the bath is continuously circulated through the previously described monitor control.

Readings of four parameters during a continuous strip coating run on the above formulation are as follows:

| | Solids (NVM) % of Total Solids | Resistance OHMS/cc | pH | Temperature °F |
|---|---|---|---|---|
| 1. | 6.01 | 1,700 | 7.00 | 74 |
| 2. | 4.46 | 1,700 | 7.00 | 74 |
| Make-up stock added. | | | | |
| 3. | 5.42 | 1,430 | 7.05 | 76 |
| 4. | 4.79 | 1,440 | 7.19 | 74 |
| Make-up stock added. | | | | |
| 5. | 5.05 | 1,525 | 7.0 | 74 |
| 6. | 4.62 | 1,520 | 7.15 | 74 |

The monitor control adjusts the bath as required in accordance with the foregoing measurements.

This sequence is repeated as necessary during the run. The variations in pH, resistance, and solids are within the operational limits for the specific paint system under evaluation.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

We claim:

1. A process for controlling the deposition of paint from a main body of an aqueous electrodeposition paint bath to which an electrical charge is applied to cause deposition of a coating of said paint which comprises passing a portion of said bath from said main body of said paint through an electrically non-conducting conduit which is of sufficient length and diameter that the electrical charge on the main body of paint is negligible at a predetermined point, testing said paint in said conduit at points where said charge from the main body of paint is negligible with devices for measuring conditions of non-volatile matter concentration, temperature, resistivity and pH value of said aqueous paint, said devices providing electrical outputs responsive to said conditions, and utilizing said electrical outputs to record said conditions and to activate mechanisms for altering said conditions in said main body of paint in accordance with variations in selected norms of said measured characteristics of the test paint.

2. In an apparatus for electrodepositing paint containing a receptacle adapted to hold a main body of an aqueous electrodeposition paint bath to which an electrical charge is applied to cause deposition of a coating of said paint, a monitoring device for continuously indicating the characteristics of said main body of said paint, said device comprising a conduit connected to said receptacle containing said main body of said paint which conduit is of sufficient length and diameter that the electrical charge on said main body of paint is negligible on liquid samples of said main body of paint carried in said conduit at the point where said conduit enters said monitoring device, a plurality of test probes in said conduit within said monitoring device sequentially arranged at spaced intervals, said probes being connected to plural measuring means to continually monitor the conditions of said bath, said measuring means comprising means for measuring the condition of non-volatile matter concentration by the dielectric quality thereof, means for measuring temperature, means for measuring resistivity and means for measuring pH value, said measuring means further comprising means to provide electrical outputs responsive to said conditions, and means responsive to said electrical outputs to record said conditions so that the operator can alter said conditions in said main body of paint in accordance with variations in selected norms of said measured characteristics of the test paint.

3. In an apparatus for electrodepositing paint containing a receptacle adapted to hold a main body of an aqueous electrodeposition paint bath to which an electrical charge is applied to cause deposition of a coating of said paint, a monitoring device for continuously indicating the characteristics of said main body of said paint, said device comprising an electrically non-conducting conduit connected to said receptacle containing said main body of said paint which conduit is of sufficient length and diameter that the electrical charge on said main body of paint is negligible on liquid samples of said main body of paint carried in said conduit at the point where said conduit enters said monitoring device, a plurality of test probes in said conduit within said monitoring device at spaced intervals, said probes being connected to plural measuring means to continually monitor the conditions of said bath, said measuring means comprising means for measuring the condition of non-volatile matter concentration by the dielectric quality thereof, means for measuring temperature, means for measuring resistivity and means for measuring pH value, said measuring means further comprising means to provide electrical outputs responsive to said conditions, and means responsive to said electrical outputs for indicating such measurements to the operator of said device, said last named means including lamp circuits comprising three lamps for each said characteristic measured by said test probes one lamp indicating an optimum condition, another lamp indicating a minimum permissible condition and a third lamp indicating a maximum permissible condition, an electrical signal circuit activated by said electrical outputs from said test probes for each monitored characteristic and means operable in response to said electrical signal to illuminate said lamps selectively depending upon whether said monitored characteristic is the optimum condition, the minimum permissible condition or the maximum permissible condition.

4. A device as claimed in claim 3 in which said last named means comprises two photocells each illuminated by the lamp indicating the optimum condition, each cell having an associated shutter adapted to screen it from said lamp, means operable in response to said signal from said test probes to move said shutters to screen their respective cells when a minimum or maximum condition is reached and switching means operable in response to the screening of one of said cells to disconnect the electrical circuit through the lamp indicating an optimum condition and establish a circuit through the lamp associated with said screened cell.

5. In an apparatus for electrodepositing paint containing a receptacle adapted to hold a main body of an aqueous electrodeposition paint bath to which an electrical charge is applied to cause deposition of a coating of said paint, a monitoring device for continuously indicating the characteristics of said main body of said paint, said device comprising an electrically non-conducting conduit connected to said receptacle containing said main body of said paint which conduit is of sufficient length and diameter that the electrical charge on said main body of paint is negligible on liquid samples of said main body of paint carried in said conduit at the point where said conduit enters said monitoring device, a plurality of test probes in said conduit within said monitoring device at spaced intervals, said probes being connected to plural measuring means to continually monitor the conditions of said bath, said measuring means comprising means for measuring the condition of non-volatile matter concentration by the dielectric quality thereof, means for measuring temperature, means for measuring resistivity and means for measuring pH value, said measuring means further comprising means to provide electrical outputs responsive to said conditions, and means for indicating such measurements to the operator of said device, said last named means including a recorder, and manual and automatic selector switches commonly electrically connected with said recorder through a switching circuit, means to adjust said switches for "automatic," "off," and "manual" operation, and electrical signal circuit from the test probes for each monitored characteristic, and means to record the signals from said signal circuit on said recorder sequentially through said switching circuit.

6. Apparatus as claimed in claim 2 comprising electrical switching means connected to the output signals of said test probes for actuating means to correct a prescribed condition of said bath.

* * * * *

PO-1050
(5/69)

UNITED STATES PATENT OFFICE
CERTIFICATE OF CORRECTION

Patent No. 3,658,676        Dated April 25, 1972

Inventor(s) Joseph M. DeVittorio and Raymond E. Story

It is certified that error appears in the above-identified patent and that said Letters Patent are hereby corrected as shown below:

Column 4, line 40, "27, 39, 31 and 33." should read
-- 27, 29, 31 and 33. --.

Column 6, line 5, "27, 39, 31 and 33," should read
-- 27, 29, 31 and 33, --; line 9, "metword 85 adapted to
delivery DC energy" should read -- network 85 adapted to
deliver DC energy --; line 31, "registor" should read
-- resistor --; line 59, "impedence" should read -- impedance --.

Column 7, line 41, "impedence" should read -- impedance --.

Column 11, line 67, "as will as" should read -- as well as --.

Signed and sealed this 21st day of November 1972.

(SEAL)
Attest:

EDWARD M. FLETCHER, JR.        ROBERT GOTTSCHALK
Attesting Officer        Commissioner of Patents